United States Patent [19]

Canalizo

[11] E Re. 30,690

[45] Reissued Jul. 28, 1981

[54] SEAL

[75] Inventor: Carlos R. Canalizo, Dallas County, Tex.

[73] Assignee: Otis Engineering Corporation, Dallas, Tex.

[21] Appl. No.: 141,069

[22] Filed: Apr. 17, 1980

Related U.S. Patent Documents

Reissue of:

[64] Patent No.: 4,109,716
Issued: Aug. 29, 1978
Appl. No.: 769,263
Filed: Feb. 16, 1977

U.S. Applications:

[63] Continuation of Ser. No. 597,962, Jul. 21, 1975, abandoned.

[51] Int. Cl.[3] ..... E21B 33/12

[52] U.S. Cl. ..... 166/191; 166/192; 277/208

[58] Field of Search ..... 166/191, 192; 277/165, 277/173, 176, 177, 206 A, 208

[56] References Cited

U.S. PATENT DOCUMENTS

| | | | |
|---|---|---|---|
| 2,954,264 | 9/1960 | Tish et al. | 277/206 A |
| 3,845,815 | 11/1974 | Garwood | 166/194 |
| 3,848,880 | 11/1974 | Tanner | 277/176 |
| 3,860,250 | 1/1975 | Lundquist | 277/165 |

*Primary Examiner*—James A. Leppink
*Attorney, Agent, or Firm*—Vinson & Elkins

[57] ABSTRACT

A sealing unit to be used in sealing system to block fluid flow between two spaced surfaces. The unit seats within a recess in one of the surfaces and includes a support to which is secured deformable sealing means having a pair of sealing members. A pressure differential across the unit deforms the sealing members into a sealing position to effectively seal between the surfaces. This abstract is neither intended to define the invention of the application which, of course, is measured by the claims, nor is it intended to be limiting as to the scope of the invention in any way.

6 Claims, 7 Drawing Figures

SEAL

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation of application Ser. No. 597,962 filed July 21, 1975 now abandoned.

BACKGROUND OF THE INVENTION

A. Field of the Invention

This invention relates to seals, and more particularly to annular seals for use with well tools which are run in well tubings.

B. Prior Art

Conventionally two types of seals are used on well tools run in a tubing; a V-type or chevron seal and an O-ring seal. Both of these seals have several undesirable characteristics.

The chevron seal requires excessive longitudinal space along the tool and must be physically displaced outwardly into sealing position. The requirements make this type of seal objectionable for small tools where tolerances are close and space for a seal is at a premium. In addition, it is difficult to energize a chevron or V-type seal into a sealing position with a low pressure differential across the seal.

O-rings seals do not have the disadvantages of chevron, V-type seals because an O-ring seal requires little space and will move into a sealing position at a low pressure differential. However, when a tool is being run in a tubing, O-ring seals on the tool tend to wash off. When the tool reaches its final position where it is to be sealed, there is no way of ascertaining whether or not the seal ring is still in position, and the tool can only be set in the hope that there will be an effective seal.

OBJECTS OF THE INVENTION

It is an object of this invention to provide a sealing system which has a sealing unit having the advantages of an O-ring seal of being capable of sealing at low pressure without having the disadvantage of an O-ring seal as far as possible displacement is concerned.

It is a further object of this invention to provide a sealing system which has a sealing unit having the advantages of a chevron seal in that it will not be displaced during travel within a pipe of flowing fluid and also having the advantage of sealing at low pressure differentials and having the further advantage of being smaller in size than the usual chevron seal.

Another object of this invention is to provide a sealing unit having spaced sealing members secured to a support with one sealing member being deformable into a sealing position by fluid flow in one direction and the other member being deformable into a sealing position by flow in the other direction and with each member being deformable at low pressure differentials without interference from the other member.

Additionally, it is an object of this invention to provide a sealing element having a support to prevent the element from being displaced while it is in position on a tool; said element including spaced sealing members which are independently deformable into a sealing position at low pressure differentials.

These and other objects and features of advantage of this invention will be apparent from the drawing, description and claims.

BRIEF DESCRIPTION OF THE DRAWINGS

In the drawings wherein the like numerals indicate like parts, and wherein illustrative embodiments of this invention are shown.

DESCRIPTION OF THE PREFERRED EMBODIMENTS

Figure 1:
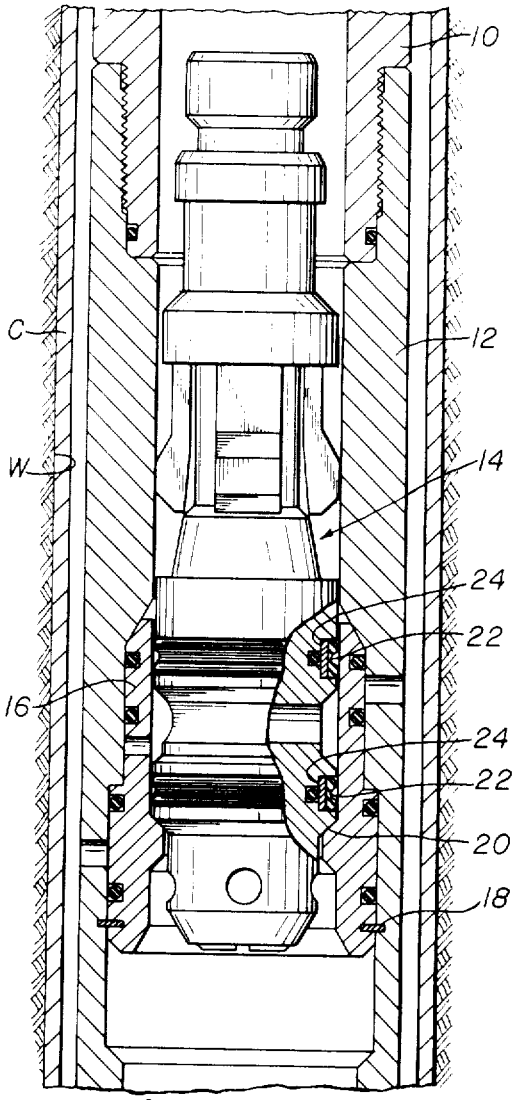
FIG. 1 is a view partly in elevation and partly in cross-section showing the sealing system constructed in accordance with the invention mounted upon a well tool which is positioned within a well tubing.

The sealing unit of this invention is particularly adapted for use with a well tool to be run in a well, although it may be used in other environments. As will be explained, the sealing unit is so designed that even though fluids in the well flow past the well tool as it is being run in the well, the sealing element will not be displaced from its position on the tool. When the tool is in final position within the well, the sealing unit then becomes a part of a sealing system to seal the annulus around the well tool.

In the drawings, (FIG. 1) a well W has the usual casing C and tubing string 10 extending therethrough and as is well known, various well operations are performed through the bore of said tubing string 10. For receiving and supporting well tools which perform the operations, a tubing string nipple 12 is connected in the tubing string 10. As an example, one operation may involve the pumping of a well tool 14 through the tubing bore, seating the tool within nipple 12, and thereafter performing the desired work. In this instance, the illustrated well tool 14 is utilized to shift a sleeve 16 which is slidable within the tubing string nipple 12. The sleeve 16 is normally retained in an upper position in the nipple by a shear pin 18 and has an internal shoulder 20 which is adapted to be engaged by the work tool 14. As shown, two spaced apart sealing units 22 are positioned in recesses 24 on the exterior of the well tool 14. The sealing units 22 function in accordance with the sealing system of this invention to seal the annulus between the well tool 14 and the sleeve 16 of the tubing string nipple 12.

Figure 2:
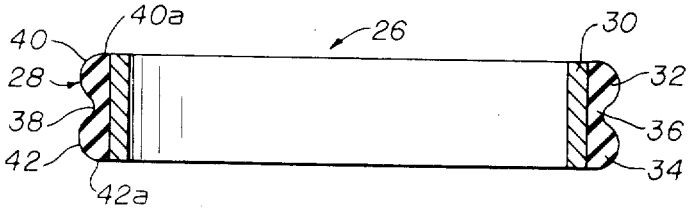
FIG. 2 is a view in section of one form of sealing unit.

One form of sealing unit 26 is shown in FIG. 2 and includes the sealing means or element 28 and a support means 30 which is preferably an annular metallic ring. The ring is mounted within an external groove 24 in the well tool (FIG. 1) to hold the sealing element in position. The sealing means or element 28 has its inner annular surface secured to the outer annular surface of the support ring 30 by any conventional bonding technique. The sealing means may be of any suitable, deformable sealing material.

To block fluid flow in either direction across the sealing unit 26, the sealing means or element 28 has its external portion shaped to form a pair of sealing members 32 and 34 which may be integral with a central connecting portion 36. Forming the sealing means 28 as one component with a pair of sealing members 32 and 34 and a central connecting portion 36 enables the entire sealing means 28 to be secured to the support means 30 in one operation. The concave face 38 provides a space between the sealing faces into which the sealing members may flow when deformed as the tool 14 moves into the sleeve 16. To insure that the central connecting portion 36 does not interfere with the deformation of each sealing member 32 and 34, said connecting portion 36 has its face 38 concave in cross-sectional shape.

The sealing members 32 and 34 each have an sealing face 40 and 42, respectively on its surface opposite the ring support means. Each sealing face, 40 and 42, is shaped to be deformable into a sealing engagement when a pressure differential exists across the sealing unit 26. In their non-deformed and non-sealing configuration, the cross-section of each sealing face 40 and 42 is generally convex in shape and the outer opposite edges 40a and 42a of each sealing face 40 and 42 are aligned with the edge of the annular support means 30. The curved sealing faces 40 and 42, and the respective sealing members 32 and 34 which form them, are spaced a sufficient distance apart by the concave connecting portion 36 so that each sealing member 30 and 32 is deformable.

The operation of each sealing unit 26 will be described along with the operation of the second form since the function of both forms is substantially the same.

Figure 3:
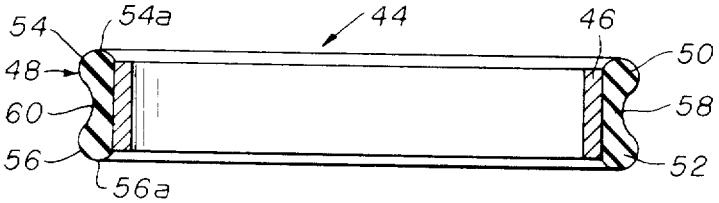
FIG. 3 is a view, in section of a second form of sealing unit.

A second form of the sealing unit 44 shown in FIG. 3 may also be utilized. Similar to the first form of sealing unit 26, this sealing unit 44 has a support means 46. Sealing means 48 of a suitable deformable sealing material is secured to the outer annular surface of the support means 46. Sealing means 48 also has a pair of sealing members 50 and 52. However, unlike the first form of sealing unit 26 where the outer edges of faces 40 and 42 were aligned with the edges of the support means 28, in this form the outer opposite faces 54a and 56a of the sealing members 48 and 50, respectively, extend beyond or overhang the edges of the support means 46. Also, like the first form of the sealing unit 24, the pair of sealing members 50 and 52 may be connected by, and integral with, a central connecting portion 58 of the same deformable material having a face 60 that is concave in cross-sectional shape to prevent interference with the deformation of the sealing members 50 and 52.

Figure 4:
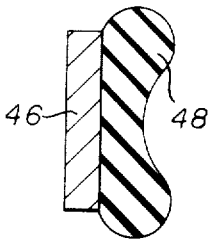
FIG. 4 is a partial enlarged sectional view of the sealing unit of FIG. 3 to more clearly illustrate its cross-sectional shape.
Figure 5:
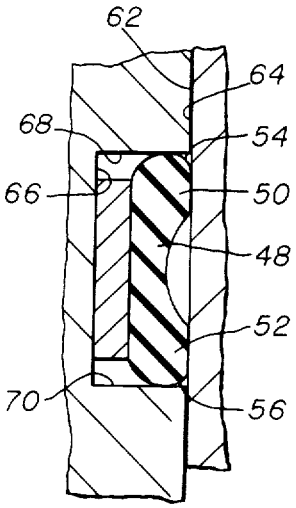
FIG. 5 is a partial enlarged sectional view of the sealing unit of FIG. 4 incorporated into a sealing system with the sealing unit in a position prior to being subjected to the pressure to be sealed.
Figure 6:
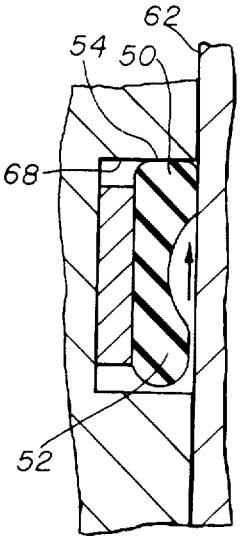
FIG. 6 is a view similar to FIG. 4 depicting the sealing unit in its sealing position.

FIGS. 4, 5 and 6 are enlarged cross-sectional partial views of the sealing means or element 48 of this second form to illustrate the positions it assumes in an undeformed condition, as part of a sealing system between two surfaces, and as deformed into sealing position. In FIG. 4 the sealing element 48 is shown in its undeformed or relaxed condition. When the sealing element is used as part of a sealing system to block fluid flow in the annulus between two surfaces 62 and 64 it is disposed between two surfaces as shown in FIG. 5. One of the surfaces has a recess 66 located therein at the site where fluid flow is to be blocked. The cross-section of the recess 66 is designed to contain the major portion of the sealing element 48 with part of each sealing member 50 and 52 protruding beyond surface 64 to provide an interference fit with the opposing surface 62. When the sealing element 48 is initially placed within the recess 66 there may not be an interference fit between the faces 54 and 56 and the side walls 68 and 70 of the recess 66. However, when the sealing members move into a position to contact the opposing surface 62 they are deformed and do engage the side walls 68 and 70 of the recess 66. This deformed position of the sealing element 48 is illustrated in FIG. 5. The opposing surfaces 62 and 64, the recess 66, and the sealing unit with the sealing element 48 now provide a sealing system.

The application of a pressure differential across the sealing system deforms the sealing means 48, as illustrated in FIG. 6, into its sealing position. An arrow indicates the direction from high to low pressure. The fluid pressure deforms the upstream sealing member 52 away from the facing surface 62 and into the spaced region between the two sealing members 50 and 52. The face 54 of the downstream sealing member 52 is deformed into a sealing engagement with the opposing surface 62 and the side wall 68 of the recess 66. Since the sealing member 50 is deformed independently from sealing member 52, the deformation of sealing member 52 into the space between the sealing members does not inhibit the deformation of sealing member 50 into its sealing engagement. After the sealing element 48 is energized the sealing member 52 may again move into contact with surface 62.

Figure 7:
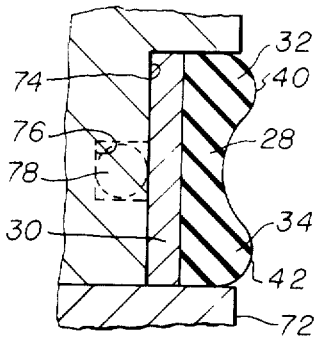
FIG. 7 is a view partly in cross-section and partly in elevation of the sealing unit of FIG. 2 incorporated into a modified form of sealing system.

In FIG. 7 an enlarged and exaggerated cross-section of the first form of sealing unit 26 is shown. Although other drawings illustrating the deformation of the sealing element 28 of this sealing unit 26 are not shown, it is to be understood that this sealing element 28 behaves quite similar to the second form of the sealing element 48. Thus, like the second form, a part of each sealing member 32 and 34 protrudes beyond surface 72 and will provide an interference fit with any opposing surface. It can be seen that because of the shape of the sealing members 32 and 34 when the sealing element is placed within recess 74 there may be no interference fit between the sealing faces 40 and 42 and the side walls of the recess. However, when a pressure differential is applied across the sealing system including this sealing element, the downstream sealing member does deform into a sealing engagement with the facing surface and the side wall of the recess.

The deformation of the sealing face against the side wall of the recess blocks any fluid that may attempt to seep past the sealing system by seeping between the annular support ring 30 and the bottom of the recess 74. If desired an additional sealing means may be provided to help block fluid flow at that location. The recess 76 and O-ring 78 as shown in FIG. 1 and, shown in dotted form in FIG. 7 to indicate it may be omitted, provide this additional seal means. With the O-ring 78 being covered by and protected by the annular support means 30 of the sealing unit 26, there are no flowing fluids and moving surfaces to wash it out of position.

A suitable deformable material for the sealing means or element may be of a hardness of 60 to 90 on the durometer scale, although other materials may also be used.

If the nipple 12 in which the well tool 14 is to be sealed has a bore diameter of approximately 2 inches, it has been found that by designing the sealing element so that the sealing members 30 and 32 have a thirty thousandths (0.030) of an inch interference fit across the diameter with the opposing surface, or fifteen thousandths (0.015) of an inch on each side, then when the well tool 14 is run in the tubing string 10, the protruding parts of the sealing members do not pinch off.

Although the described forms of the sealing element has it secured to the outer annular surface of the support means and have a central connecting portion connecting and formed integrally with the sealing members, it is to be understood that a sealing element may be provided where the sealing means, while secured to the support means, is not secured to the outer annular surface of the support means and where each sealing member is separate and no connecting seal section 38 is present. The support means is provided to maintain the sealing means in position in the recess. Two sealing members of the sealing means are provided, one of which blocks fluid flow in one direction across the sealing element, the other blocks flow in the other direction. A space is provided between the sealing faces into which the sealing member may flow when deformed. The sealing members are spaced a sufficient distance apart on the support means so that each member is deformable without interference from the other sealing member.

In some systems the seal may be carried internally of a member and engage a mandrel or the like within the member, but such contribution is not normally preferred in a well.

From the foregoing description it can be seen that the objects of this invention have been obtained. An annular sealing unit for use on the exterior of a well tool has been provided. The sealing unit does not require a lot of space. The support means maintains the unit in a recess around the well tool as the tool moves through flowing fluid in the tubing string. Because the sealing means is deformable, the sealing unit will set into sealing engagement at a low pressure differential. In addition, the sealing element may be set into sealing engagement regardless of the direction of the pressure differential across it.

The foregoing disclosure and description of the invention are illustrative and explanatory thereof and various changes in the size, shape and materials, as well as in the details of the illustrated construction may be made within the scope of the appended claims without departing from the spirit of the invention.

What is claim is:

1. Apparatus comprising:

[(a) a nipple having an interior cylindrical surface;]

[(b)] a well tool having an exterior cylindrical surface and adapted to be run in a well and adapted to be landed and sealed in [said] *a* nipple, *having an interior cylindrical surface,* so that fluid flow in the annulus between said interior cylindrical surface and said exterior cylindrical surface is blocked at the sealing location; and

[(c)] at least one annular sealing system comprising:

(i) said exterior cylindrical surface having an annular recess located at the site where it is desired to block the fluid flow, and said exterior cylindrical surface being located so that it is exposed to flowing well fluids during the running of said well tool in a well, and (ii) an annular sealing unit associated with said recess and including a portion which is exposed to flowing well fluids when said well tool is being run in a well and including (A) ring support means received entirely within said recess, (B) annular deformable sealing means secured to said ring support means and having a portion received within said recess and a portion projecting from said recess for sealing with said interior cylindrical surface, (C) said sealing means including a pair of spaced sealing members with each sealing member having an outer convex curved sealing face projecting from said recess and with said sealing means being contoured to provide a space between the sealing faces into which the sealing members may flow when deformed and with each sealing member sized so that said portion projecting from said recess provides an interference fit with said interior cylindrical surface when said well tool is landed in said nipple.

2. The apparatus of claim 1 wherein said pair of sealing members are connected to each other by an integral central connecting portion of the same deformable material.

3. The apparatus of claim 2 wherein said central connecting portion has a concave face on its surface opposite said ring support means which provides a space into which each sealing member may be deformed.

4. The apparatus of claim 1 including seal means between the base of said recess and said support means.

5. The apparatus of claim 1 wherein the outer opposite edges of each sealing face are aligned with the edge of said ring support means.

6. The apparatus of claim 1 wherein the outer opposite faces of said sealing members overhang the edges of the said ring support means.

* * * * *